(12) United States Patent
Itou

(10) Patent No.: US 8,301,204 B2
(45) Date of Patent: *Oct. 30, 2012

(54) ELECTRONIC DEVICE AND COMPUTER-READABLE MEDIUM

(75) Inventor: Jun Itou, Sagamihara (JP)

(73) Assignee: Casio Hitachi Mobile Communications Co. Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/162,279

(22) Filed: Jun. 16, 2011

(65) Prior Publication Data

US 2011/0241880 A1    Oct. 6, 2011

Related U.S. Application Data

(63) Continuation of application No. 12/152,798, filed on May 16, 2008, now Pat. No. 7,974,607.

(30) Foreign Application Priority Data

May 18, 2007 (JP) ................................. 2007-132383

(51) Int. Cl.
*H04M 1/00* (2006.01)
*H04B 1/38* (2006.01)

(52) U.S. Cl. ..................... 455/567; 455/550.1; 455/415; 455/419

(58) Field of Classification Search ............... 455/550.1, 455/567, 415, 419
See application file for complete search history.

(56) References Cited

U.S. PATENT DOCUMENTS

| 7,050,836 B2 | 5/2006 | Pääkkönen | |
|---|---|---|---|
| 2003/0054867 A1* | 3/2003 | Dowlat et al. | 455/567 |
| 2004/0266489 A1 | 12/2004 | Chipchase et al. | |
| 2006/0003758 A1* | 1/2006 | Bishop et al. | 455/419 |
| 2006/0154692 A1 | 7/2006 | Ikehara et al. | |

FOREIGN PATENT DOCUMENTS

| JP | 06-326659 | 11/1994 |
|---|---|---|
| JP | 07-245656 | 9/1995 |
| JP | 10-191460 | 7/1998 |
| JP | 11-298600 | 10/1999 |
| JP | 2001-268216 | 9/2001 |
| JP | 2004-328552 | 11/2004 |
| JP | 2005-236615 | 9/2005 |
| JP | 2006-211287 | 8/2006 |

* cited by examiner

*Primary Examiner* — Lewis West
(74) *Attorney, Agent, or Firm* — Thomas Langer

(57) ABSTRACT

A CPU 11, in the condition where the limited mode is not set, outputs the data arbitrarily selected by a user operation from a display unit 18 and a sound speaker 23, and in the condition where the limited mode is set, predetermined data is output instead of data specified by the user. As a result, in the case in which data is output according to the operation of a function included in an electronic device, even if no limitation is imposed to that function, the output of data or information, which the third party should not know about, can be prevented merely by setting the limited mode, in which limitations are imposed on the operation.

8 Claims, 19 Drawing Sheets

FIG. 3

IMAGE DATA MEMORY UNIT M1

| DATA ID | TITLE | ACTUAL DATA |
|---------|-------|-------------|
| P001 | AAAA | * * * * * * * * * * |
| P002 | BBBB | * * * * * * * * * * |
| ... | ... | ... |

FIG. 4

SOUND DATA MEMORY UNIT M2

| DATA ID | TITLE | ACTUAL DATA |
|---------|-------|-------------|
| S001 | CCCC | * * * * * * * * * * |
| S002 | DDDD | * * * * * * * * * * |
| ... | ... | ... |

FIG. 5

SETTING INFORMATION MEMORY UNIT M3

| CLASSIFICATION | | USER'S SELECTION | INITIAL VALUE | IN LIMITED MODE | CONTENT OF SETTING |
|---|---|---|---|---|---|
| INCOMING CALL NOTIFICATION | RING ALERT FOR INCOMING CALL | S021 | S001 | INITIAL VALUE | — |
| | IMAGE FOR INCOMING CALL | P021 | P001 | INITIAL VALUE | — |
| EMAIL RECEPTION NOTIFICATION | RING ALERT FOR EMAIL RECEPTION | S022 | S002 | SPECIFIED (S010) | — |
| | IMAGE FOR EMAIL RECEPTION | P022 | P002 | SPECIFIED (P010) | — |
| ALARM NOTIFICATION | ALARM SOUND | S023 | S003 | SPECIFIED (S011) | 2008/10/10 10:00— MANAGEMENT STRATEGY MEETING |
| | ALARM IMAGE | P023 | P003 | SPECIFIED (P011) | |
| WALLPAPER | WALLPAPER IMAGE | P024 | P004 | INITIAL VALUE | — |
| SCREEN SAVER | SCREEN SAVER IMAGE | P025 | P005 | INITIAL VALUE | NO OPERATION OVER FIVE MINUTES |

FIG. 6

ADDRESS BOOK MEMORY UNIT M4

| ADDRESS BOOK ID | NAME | PHONE NUMBER | EMAIL ADDRESS | PERSONALLY-ALLOCATED RING ALERT FOR INCOMING CALL | PERSONALLY-ALLOCATED IMAGE FOR INCOMING CALL | PERSONALLY-ALLOCATED RING ALERT FOR EMAIL RECEPTION | PERSONALLY-ALLOCATED IMAGE FOR EMAIL RECEPTION |
|---|---|---|---|---|---|---|---|
| A001 | EEEE | ***** | ***** | S051 | P061 | S071 | P081 |
| A002 | FFFF | ***** | ***** | S055 | P065 | S075 | P085 |
| A003 | GGGG | ***** | ***** | S058 | P068 | S078 | P088 |
| ... | ... | ... | ... | ... | ... | ... | ... |

ELECTRONIC DEVICE AND COMPUTER-READABLE MEDIUM

RELATED APPLICATIONS

This application is a continuation of U.S. patent application Ser. No. 12/152,798 filed with the U.S. Patent and Trademark Office on May 16, 2008, claiming priority from Japanese Patent Application No. 2007-132383 filed on May 18, 2007, the disclosures of which applications are expressly incorporated herein by reference in their entirety.

BACKGROUND OF THE INVENTION

1. Field of the Invention

The present invention relates to an electronic device having an output function for outputting data.

2. Description of the Related Art

Conventionally, among electronic devices such as cellular phones, in the case of theft and loss thereof, to prevent any misuse by the third party a limited mode, in which limitations are imposed on an input operation to the electronic device, can be set by performing remote operation from other electronic devices is known. For example, Unexamined Japanese Patent Application KOKAI Publication No. 2001-268216 discloses a portable terminal device which limits the input operation according to the control information when receiving character information including control information. According to this portable terminal device, even if its user (owner) loses this portable terminal device, once he sends character information including control information to that device, limitations are imposed on the input operation of the device. As a result, misuse by the third party finding this device can be effectively prevented.

However, even though limitations are imposed on the input operation, as disclosed in the Unexamined Japanese Patent Application KOKAI Publication No. 2001-268216, data may be outputted not because of the input operation but because of the operation of a determined function of the portable terminal device. A situation may occur, for example, when a wallpaper image is displayed on a standby display screen, ring alerts notifying a user of incoming calls or received emails from other portable terminal devices or images for incoming calls or received emails, which are set by the user, are unwittingly displayed on the display screen. The data such as wallpaper images, ring alerts for incoming calls or received emails and images for incoming calls or received emails, are often set by each user's selection. Therefore, outputting those data results in that the third party finding the portable terminal device knows the preferences of its user (what kind of music is used as a ring alert etc.). Further, when those data include portrait photos or voice sounds of the user himself or his friends, or personal information such as phone numbers or email addresses of other persons, a problem in that leakage of important information may occur.

In order to prevent the situation in which own or other persons information is unwittingly leaked to be known to the third party, it is sufficient that limitations are imposed on the input operation of the portable terminal device and, at the same time, also to the operation of various functions (functions such as telephone conversation or email receiving/sending) themselves. However, once such limitations have been imposed, it may be disadvantageous for the user, when this electronic device comes back to them. That is, if limitations are imposed on the incoming function itself when the device has been missing, the owner of the portable terminal device can not be informed of any incoming calls or received emails even if someone has made a call or sent an email during that period, since the incoming function itself is disabled.

SUMMARY OF THE INVENTION

In view of solving the problems described above, one object of the present invention is to prevent, the data from being output, which the third party should not know about in the case in which data is output from an electronic device upon the operation of a determined function of the electronic device.

In order to achieve the above object, an electronic device according to a first aspect of the present invention includes: an output unit that outputs data; a data memory unit that stores data specified by a user operation; a mode setting unit that sets the limited mode for limiting operations; a detecting unit that detects an occurrence of an event; a determining unit that determines whether the limited mode is set by the mode setting unit in the case in which the detecting unit detects the occurrence of the event; a first output control unit that reads out data stored in the data memory unit and makes the output unit output the data according to the event detected by the detecting unit, in the case in which the determining unit determines that the limited mode is not set; and a second output control unit that makes the output unit output predetermined data according to the event detected by the detecting unit, instead of data stored in the data memory unit, in the case in which the determining unit determines that the limited mode is set.

Further, in order to achieve the above-mentioned object, an electronic device according to a second aspect of the present invention includes: an output unit that outputs information relating to the party at the other end of the communication; a mode setting unit that sets a limited mode in which limitations are imposed on an operation; a detecting unit that detects an occurrence of an event; a determining unit that determines whether the limited mode is set by the mode setting unit in the case in which the detecting unit detects an occurrence of an event; a first output control unit that makes the output unit output the data relating to the party at the other end of the communication in the case in which the determining unit determines that the limited mode is not set; and a second output control unit that restrains the output unit from outputting the data relating to the party at the other end of the communication, in the case in which the determining unit determines that the limited mode is set.

BRIEF DESCRIPTION OF THE DRAWINGS

These objects and other objects and advantages of the present invention will become more apparent upon reading of the following detailed description and the accompanying drawings in which:

FIG. 3 is a view for explaining an image data memory unit.

FIG. 4 is a view for explaining a sound data memory unit.

FIG. 5 is a view for explaining a setting information memory unit.

FIG. 6 is a view for explaining an address book memory unit.

DETAILED DESCRIPTION OF THE PREFERRED EMBODIMENT

Hereinafter, one embodiment according to the present invention will be described with reference to FIG. 1 to FIG. 19. In this embodiment of the present invention, it is assumed that an electronic device according to the present invention is a cellular phone.

Figure 1:
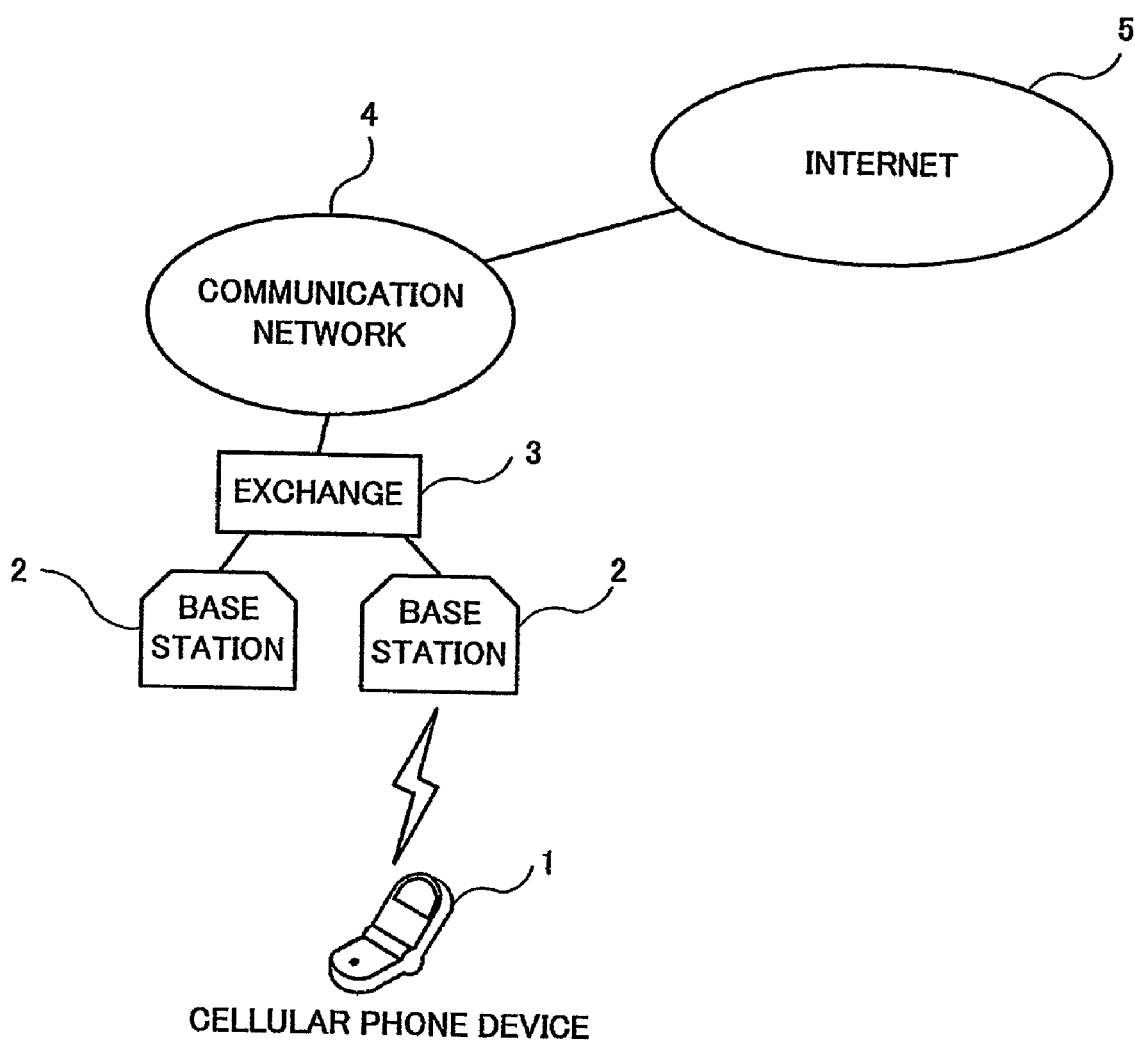
FIG. 1 is a block diagram showing a communication network system of a cellular phone device according to one embodiment of the present invention.

As shown in FIG. 1, a communication network system according to the present invention includes a cellular phone device 1, a base station 2, an exchange 3, a communication network 4 and an internet 5.

The cellular phone device 1 includes functions, which common multifunctional cellular phones have, such as a telephone conversation function, an email function, an internet access function (Web access function), a camera function or a sound recording function.

The cellular phone device 1 is connected to the communication network (public mobile communication network) 4 via the nearest base station 2 and the exchange 3. Further, the cellular phone device 1 can be connected to the internet 5 via the communication network 4.

The cellular phone device 1 has a normal mode and a limited mode. The limited mode is an operation mode (lock mode), in which limitations are imposed on the output so as to prevent the cellular phone device 1 from outputting personal information. The normal mode is, on the other hand, an operation mode, in which the cellular phone device 1 can output personal information. In limited mode, limitations are not imposed on various functions such as the telephone conversation function or the email function themselves. But, in limited mode, limitations are imposed on the operation of the cellular phone device 1 (for example, an operation for originating telephone conversation, an operation for composing or sending an email etc.). Further, it is possible for the user to direct the cellular phone device 1 by operating a PC (Personal Computer) or other cellular phone devices via the internet 5 etc. so that the limited mode is set. For instance, the user sends an email including a predetermined content to the cellular phone device 1 or performs telephone conversation at the same phone number for a predetermined number of times within a predetermined period of time, whereby the user can set the cellular phone device 1 to the limited mode or cancel the limited mode according to the contents of the directions.

In addition, the cellular phone device 1 has a function for operating upon various events. The events occur when the cellular phone device 1 receives an incoming call, the current time coincides with an alarm generation time, or a period of time, during which no operation is carried out, has elapsed for a predetermined time. That is, the events occur when the various functions of the cellular phone device 1 are carried out.

Figure 2:
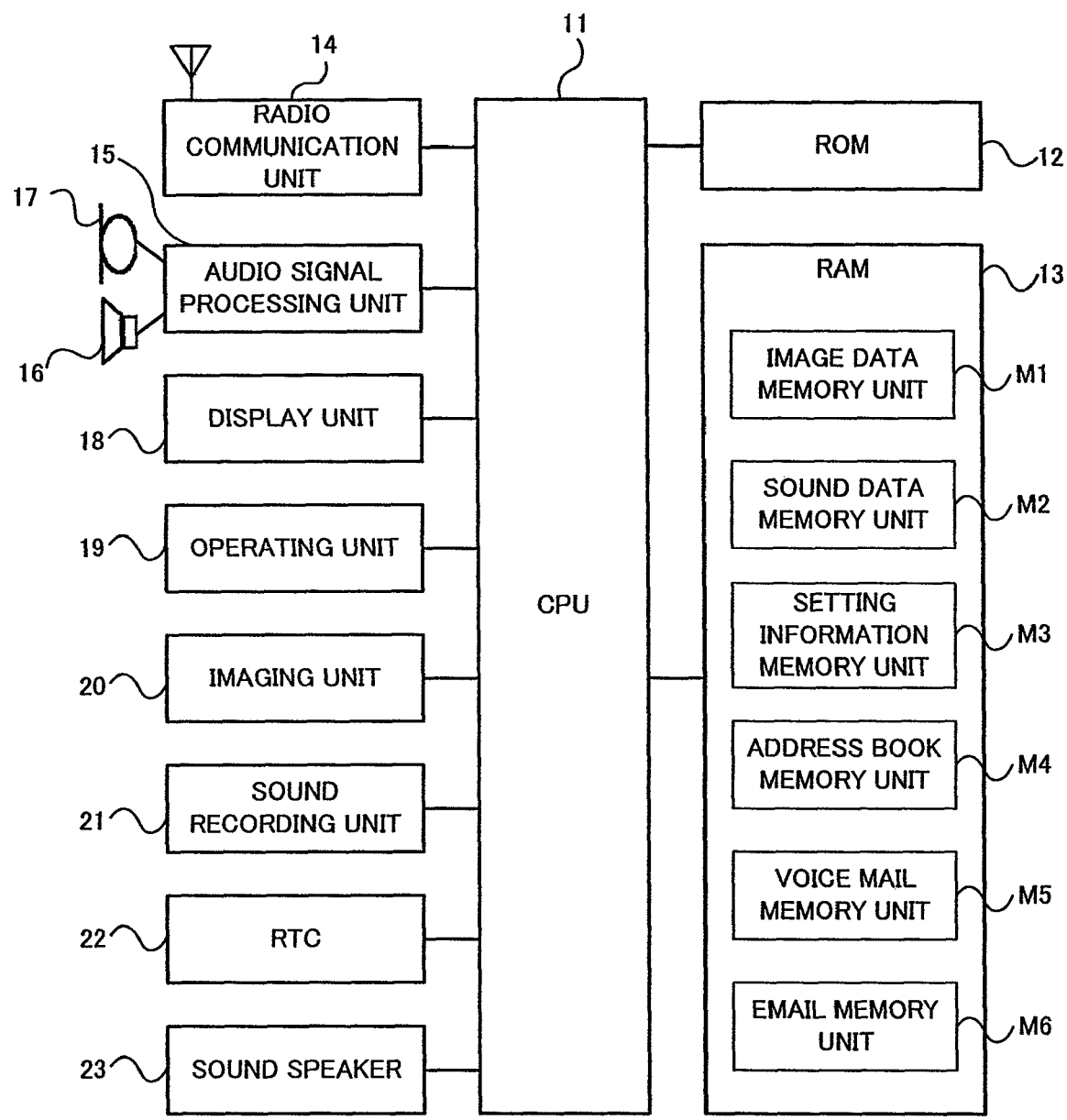
FIG. 2 is a block diagram showing basic components of a cellular phone device.
Figure 7A:
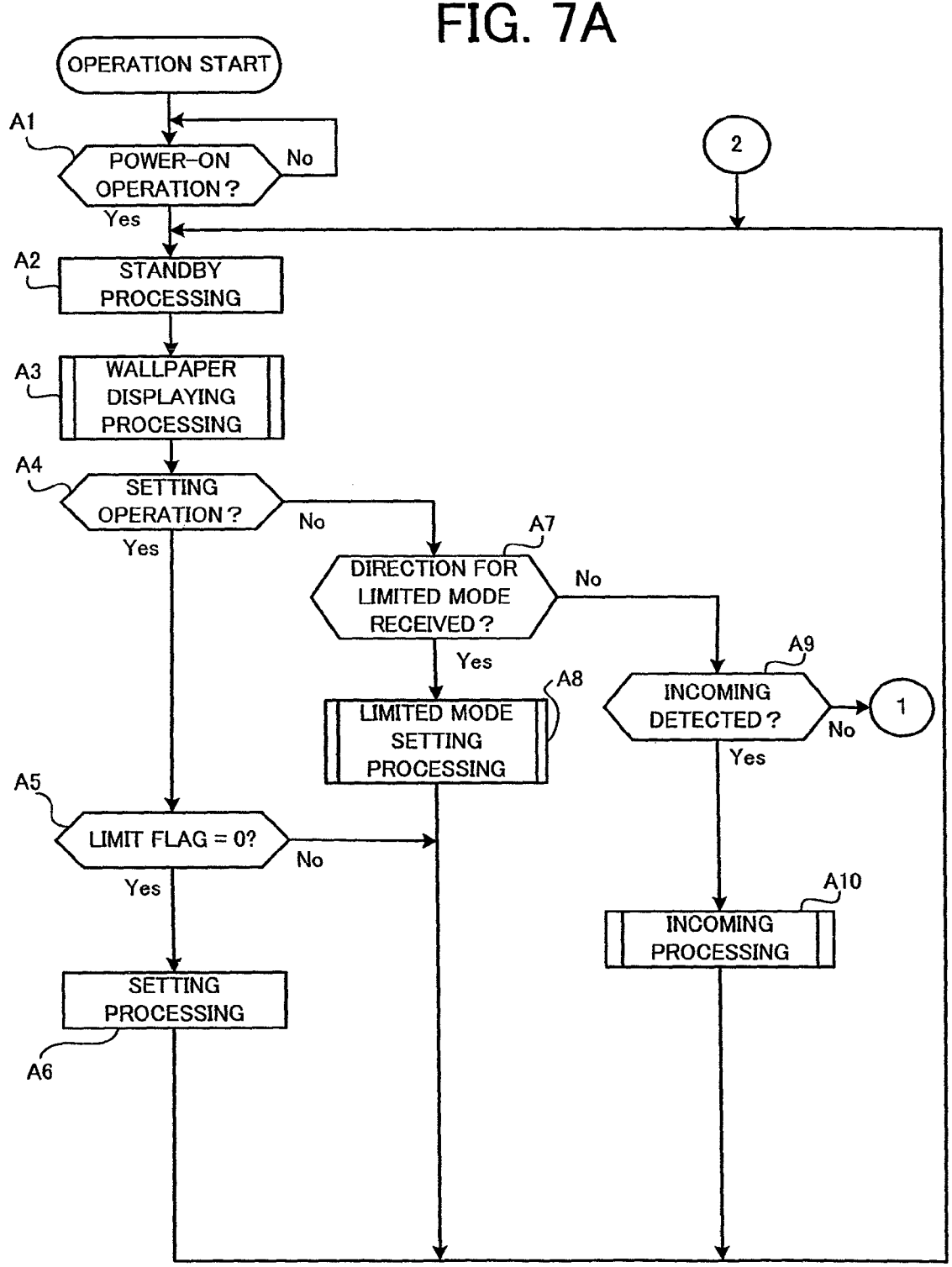
FIGS. 7A and 7B are flowcharts for showing a general outline of the whole operation of the cellular phone device.
Figure 7B:
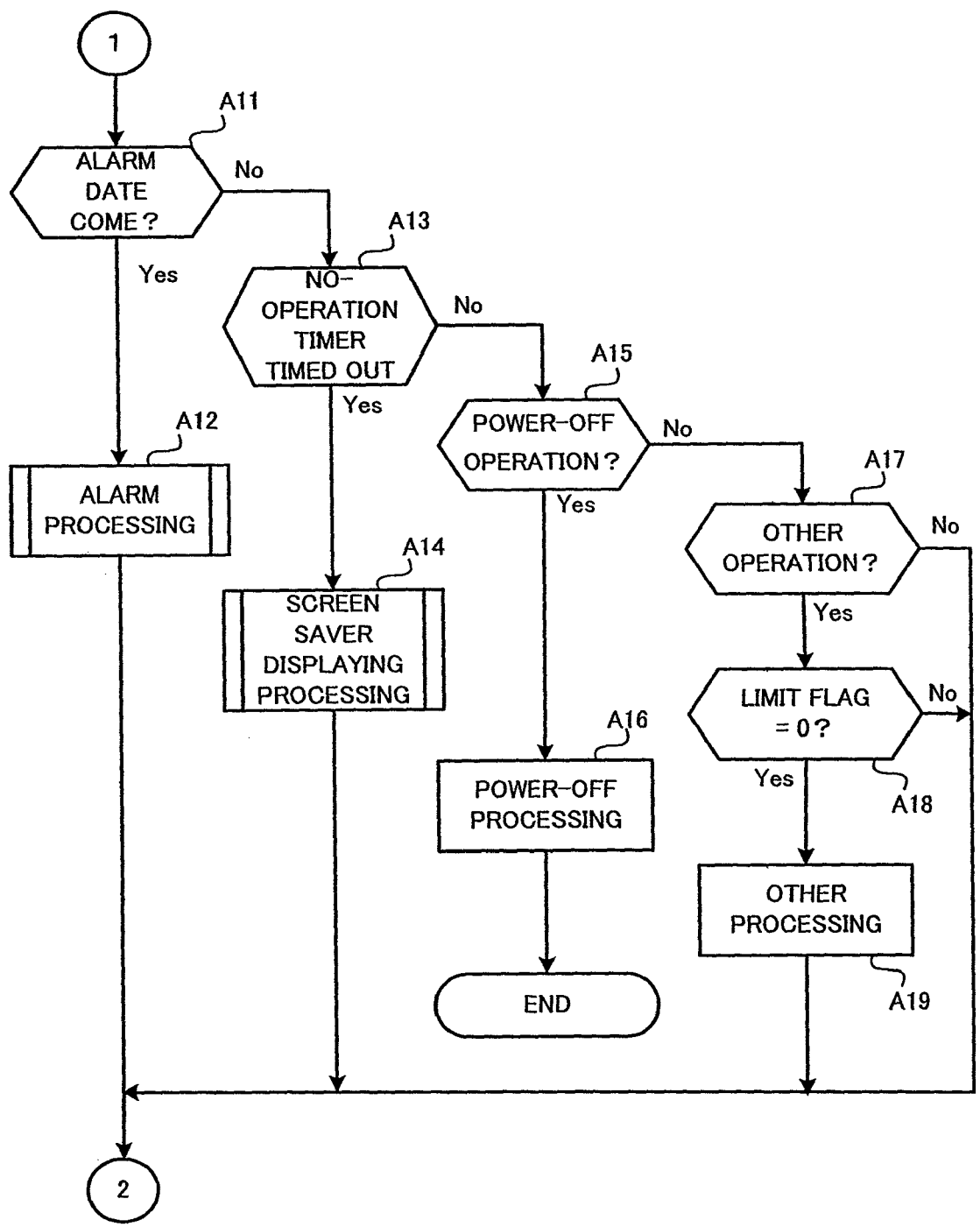

The cellular phone device 1 includes a CPU 11, a ROM 12, a RAM 13, a radio communication unit 14, an audio signal processing unit 15, a display unit 18, an operating unit 19, an imaging unit 20, a sound recording unit 21, an RTC 22, and a sound speaker 23 as shown in FIG. 2.

The CPU (Central Processing Unit) 11 performs various programs in the ROM (Read Only Memory) 12 so as to control the whole operation of the cellular phone device 1.

Stored in the ROM 12 is a program code for realizing this embodiment of the present invention according to operation procedures shown in FIG. 7 to FIG. 12 described later. The CPU 11 follows this program code and performs the various operations sequentially.

The RAM (Random Access Memory) 13 is a writable and readable memory. The RAM 13 includes an image data memory unit M1, a sound data memory unit M2, setting information memory unit M3, an address book memory unit M4, a voice mail memory unit M5, and an email memory unit M6. Furthermore, the RAM 13 stores a flag showing whether the cellular phone device 1 is set in the normal mode or the limited mode. For example, in the normal mode, the CPU 11 makes a limit flag, which is stored in the RAM 13, be '0' (reset), while in limited mode, the CPU 11 makes the limit flag be '1' (set). It should be noted that the contents of the RAM 13 are stored in a non-volatile memory (not shown) such as a flash memory, if needed.

The radio communication unit 14 loads a signal from the receiving side of a sending/receiving unit (base band unit) connected to an antenna and demodulates the signal into a receiving base band signal, thereby outputting it as sound from an earphone speaker 16 via the audio signal processing unit 15. Further, the radio communication unit 14 loads, through the audio signal processing unit 15, audio data inputted from a mouthpiece microphone 17 and encodes the data into a sending base band signal to be sent and outputted from a sending antenna of the sending/receiving unit.

On the other hand, the CPU 11 has the display unit 18 display data which is obtained by the email function or the internet access function via the radio communication unit 14.

The operating unit 19 is to be operated by the user. According to the operation by the user, numbers to be dialed, characters, commands or the like put into the operating unit 19. The operating unit 19 sends this input data to the CPU 11.

The imaging unit 20 has functions for still image pickup and moving image pickup. To be more specific, the imaging unit 20 includes a lens/mirror block, an imaging element, other drives, a distance measuring sensor, a light quantity sensor, an analog processing circuit, a signal processing circuit, a compression/extension circuit etc.

The sound recording unit 21 has a function for voicemail service and records speech sound of the party at the other end received from the terminal of the other party at the time of absence.

The RTC (Real Time Clock) 22 counts the current time (year, month, day, hour, minute, second). The CPU 11 obtains the data of the current time from the RTC 22.

The sound speaker 23 is a high sound pressure type speaker capable of outputting ring alerts, voice sound from the party at the other end or music melody.

Next, the memory unit M1 to M6 provided in the RAM 13 will be explained in details.

The image data memory unit M1 of the RAM 13 stores images such as image data, for example, a wall paper image, a screen saver image or an image for incoming call, in a way that to each image data 'data ID', "title" and "actual data" are related, as shown in FIG. 3.

The wallpaper image is an image displayed on the screen of the display unit 18 when the cellular phone device 1 is in a standby state. The screen saver image is an image displayed on the screen of the display unit 18 when the user performs no operations over a fixed time period in the case when the cellular phone device 1 is in action. The image for incoming call is displayed on the screen of the display unit 18 when the cellular phone device 1 receives an incoming call.

Note that the 'data ID' is identification information of image data and corresponds to 'P001' and 'P002' in the case of FIG. 3. The "title" is the title of image.

Next, the sound data memory unit M2 of the RAM 13 stores sound data such as ring alerts for incoming calls, ring alerts for email reception, alarm sounds or the like in a way that to each sound data 'data ID', "title" and "actual data" are related, as shown in FIG. 4.

The ring alert for email reception is sound, which is outputted from the sound speaker 23 when emails are received by the email function of the cellular phone device 1. The ring alert for incoming calls is sound, which is outputted from the sound speaker 23 when the cellular phone device 1 receives an incoming call from the party at the other end. The alarm sound is sound, which is output from the sound speaker 23 at a date set by the user at his own choice by the alarm function included in the cellular phone device 1.

Note that the 'data ID' is identification information of sound data and corresponds to 'S001' and 'S002' in the case of FIG. 4. The sound data may be those downloaded and received sound data via the internet 5 or those recorded by the sound recording unit 21.

The setting information memory unit M3 of the RAM 13 stores various data such as sound data or image data output from the sound speaker 23 or the display unit 18 upon various events.

For example, as shown in FIG. 5, the setting information memory unit M3 stores "user's selection", "initial value", "in limited mode" and "contents of setting" in a way that those are related to "incoming call notification" "email reception notification", "alarm notification", "wallpaper" and "screen saver".

The 'data ID' in the image data memory unit M1 or the 'data ID' in the sound data memory unit M2 respectively corresponding to image data or sound data, which the user sets by operations at his own choice, are stored in the "user's selection". For example, as shown in FIG. 5, 'S021', which is identification information of sound data, is stored in the "ring alert for incoming call", while 'P022', which is identification information of image data, is stored in the "image for email reception".

Stored in the "initial value" is image data, which is set to an initial value at the time of product shipment of the cellular phone device 1, and the 'data ID' for locating sound data.

Stored in the "in limited mode" are either 'the initial value' or 'specified' and the 'data ID' corresponding thereto. For example, when the CPU 11 is in limited mode in the case in which the CPU 11 performs the processing, which is located in 'classification' shown in FIG. 5, to consult the "in limited mode". If the 'initial value' is set, then data, which is located in the "data ID" stored in the 'initial value', is output. On the other hand, if 'specified' is set, the data, which is located in the "data ID" of that, is output. That is to say, stored in "in limited mode" is the 'data ID' of image data or sound data output instead of data set by arbitrary choice of the user during the time in which the limited mode is set.

Note that sound data and image data set in "specified" should not be those, with which the third party may identify the persons at the other end, or the owner of the cellular phone device 1. That data should be those, which are not problematic even in the case of being output and known to the third party.

Stored in the "content of setting" are planned data and planned contents corresponding to the "alarm notification", for example. Further, the condition, under which the screen saver image is displayed, is stored in accordance with the "screen saver". For example, stored in the setting information memory unit M3 shown in FIG. 5 are for the "content of setting" corresponding to the "alarm notification" '2008/10/10, 10:00~, management strategy meeting' as the planned data and planned contents.

Stored in the "content of setting" corresponding to the "screen saver" is "no operation over five minutes", which shows that the user performs no operation over five minutes, as the condition, under which the screen saver image is displayed. That is to say, when an event registered in the "content of setting" occurs, the CPU 11 performs operation located in the "classification" shown in FIG. 5.

The address book memory unit M4 of the RAM 13 stores, as shown in FIG. 6, "address book ID", "name", "phone number" and "email address", "personally-allocated ring alert for incoming call", "personally-allocated image for incoming call", "personally-allocated ring alert for email reception" and "personally-allocated image for email reception" in a way that they are related to each other.

The "address book ID" is identification information of address.

The "name", the "phone number" and the "email address" stand respectively for the name, the phone number and the email address of a person located in the address book ID.

The "personally-allocated ring alert for incoming call" and the "personally-allocated image for incoming call" show the data ID of the output ring alert for incoming call and image for incoming call when an incoming call is received from the corresponding person.

The "personally-allocated ring alert for email reception" and the "personally-allocated image for email reception" show the data ID of the output ring alert for email reception and image for email reception when an incoming call is received from the corresponding person.

Stored in the "personally-allocated ring alert for incoming call" and the "personally-allocated ring alert for email reception" is one of the "data ID" of sound data stored in the sound data memory unit M2.

Stored in the "personally-allocated image for incoming call" and the "personally-allocated image for email reception" is one of the "data ID" of image data stored in the image data memory unit M1.

By setting different ring alerts for incoming calls or images for incoming calls for each person, the user can easily identify callers. Likewise, by setting different ring alerts for email reception or images for email reception, the user can easily identify senders of emails.

The CPU 11 outputs, in the case of reception of incoming call or email reception, when the operation mode is the normal mode, the ring alert for incoming call and image for incoming call, which are located in the 'data ID' are stored in the address book memory unit M4. Also, the CPU 11, when the operation mode is in limited mode, outputs the ring alert and image specified by the information set up in the "in limited mode" of setting information memory unit M3.

The voice mail memory unit M5 of the RAM 13 stores voice messages. For instance, when the cellular phone device 1 is in the state in which the answering machine of the cellular phone device 1 is in action, the voice mail memory unit M5 stores messages left by callers.

The email memory unit M6 of the RAM 13 stores the contents of received emails.

Next, the operation of the cellular phone device 1 will be described with reference to the flowcharts shown in FIG. 7 to FIG. 12.

When the main switch of the cellular phone device 1 is turned on, the power supply to the CPU 11 starts. Then, the CPU 11 begins to perform the processing shown in FIGS. 7A and 7B, and repeats the determination whether the operation for turning on the power supply source is performed or not (step A1).

When the user operates the operating unit 19, thereby turning on the power supply source of the cellular phone device 1, the CPU 11 detects this action (Yes in step A1) and performs the standby processing so that the standby state for communication is established (step A2). Then, The CPU 11 performs the wallpaper displaying processing in order to display the standby image on the display unit 18 (step A3).

Figure 8:
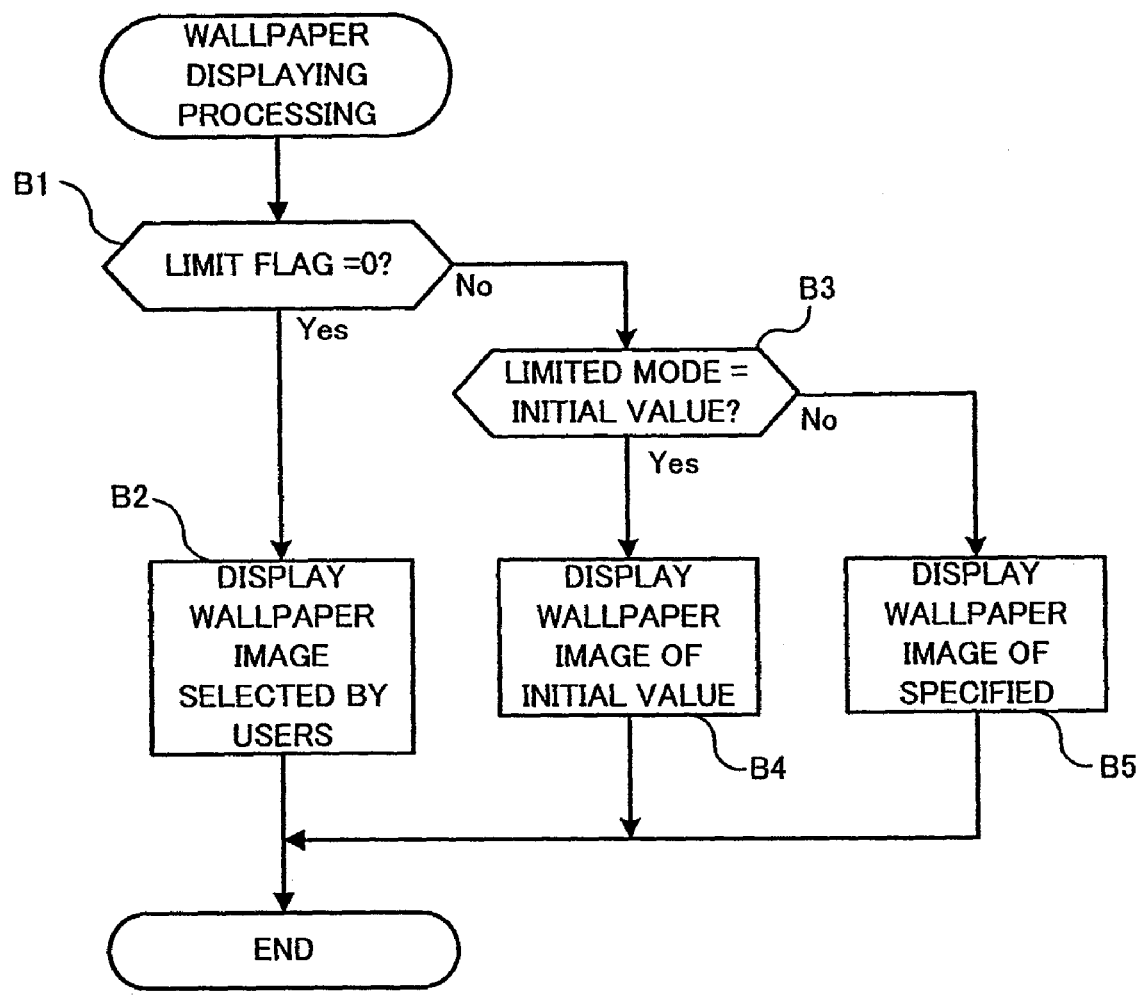
FIG. 8 is a flowchart for explaining wallpaper displaying processing in detail.

In this wallpaper displaying processing (step A3), the CPU 11 consults the limit flag stored in the RAM 13, as shown in FIG. 8, so as to determine whether the operation mode is the normal mode or the limited mode (step B1 in FIG. 8). When the limit flag is reset to '0' and the normal mode is set (Yes in step B1), the CPU 11 has the display unit 18 display the wallpaper image which is selected by the user (step B2).

That is to say, the CPU 11 consults 'data ID' in the "user's selection" of the entry of the "wallpaper image" in the setting information memory unit M3 and reads out the image data in accordance with the 'data ID' stored in the image data memory unit M1, so that the image data is displayed on the display unit 18.

When the limit flag is '1' and the limited mode is set (No in step B1), the CPU 11 consults the setting information memory unit M3 so as to determine whether the item of the "in limited mode" of the entry of the "wallpaper image" is set to the 'initial value' or not (step B3). In the example shown in FIG. 5, the "in limited mode" corresponding to the "wallpaper image" is the 'initial value' (Yes in step B3). Then, the CPU 11 reads out, from the image data memory unit M1, image data, which is located in the data ID P004 shown in this "initial value" so that the image data is made to be displayed on the display unit 18 (step B4).

Also, when the item of the "in limited mode" of the entry of the "wallpaper image" of the setting information memory unit M3 is set to the 'specified' (No in step B3), the CPU 11 has the display unit 18 display a wall paper image corresponding to this 'specified' (step B5). In other words, the CPU 11 consults the setting information memory unit M3 and reads out image data, which is located in the 'data ID' corresponding to the "specified" stored in the item of the "in limited mode", from the image data memory unit M1 so that the image data is made to be displayed on the display unit 18.

As thus described above, the CPU 11 consults the limit flag stored in the RAM 13 and prevents data, which is usually set by the user, from being output in the case in which the limit flag is '1'.

Now, referring back to FIG. 7A, after the wallpaper displaying processing (step A3 of FIG. 7A) has been completed, the CPU 11 determines whether the user performs operation for changing the settings (step A4). When, at this moment, the user operates the operating unit 19 in order to perform operation for changing the contents, which are set for the functions of the cellular phone device 1 (Yes in step A4), the CPU 11 consults the limit flag stored in the RAM 13 so as to determine whether the normal mode or the limited mode is set (step A5). When the limit flag is '1' and the limited mode is set (No in step A5), the CPU 11 cancels instructions for changing the settings from the user and returns to the state of the above-mentioned standby processing (step A2) without making any changes in the settings. When the limit flag is '0' and the normal mode is set (Yes in step A5), the CPU 11 performs processing based on the direction for changing the settings from the user (step A6). After that, the flowchart returns to the above-mentioned standby processing (step A2).

When the CPU 11 receives signal for directing setting/cancellation of the limited mode via the radio communication unit 14 upon remote operation from the user (Yes in step A7 of FIG. 7A), it proceeds to a limited mode setting processing (step A8).

Figure 9:
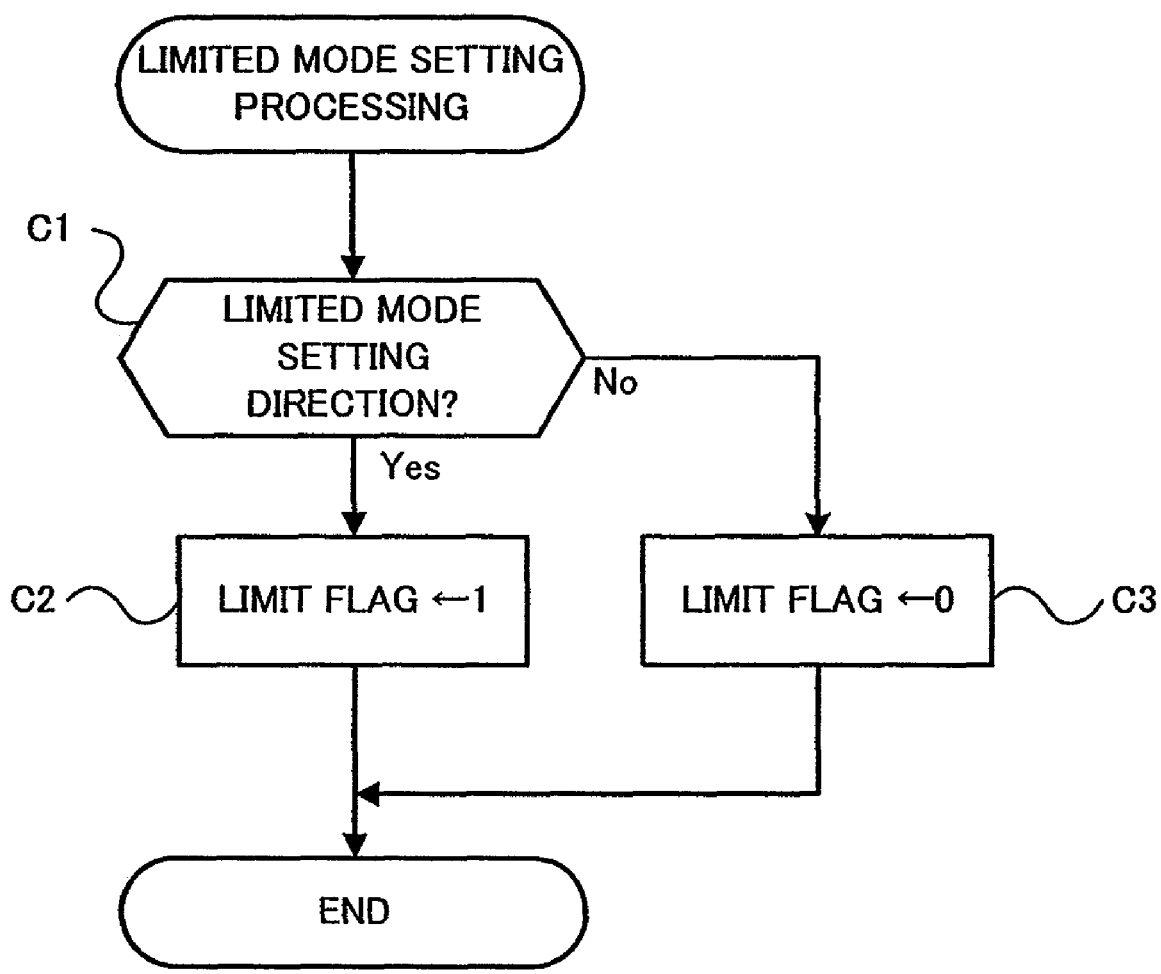
FIG. 9 is a flowchart for explaining limited mode setting processing in detail.

As shown in FIG. 9, the limited mode setting processing (step A8 of FIG. 7A) is as follows: The CPU 11 obtains a direction signal received at the radio communication unit 14 and determines whether the direction is for setting the limited mode or the normal mode (step C1). If the direction is for setting the limited mode (Yes in step C1), the CPU 11 gives a direction to change the limit flag stored in the RAM 13 to be '1' (step C2). On the other hand, if the direction is for setting the normal mode (No in step C1), the CPU 11 gives a direction to change the limit flag stored in the RAM 13 to be '0' (step C3).

After the limited mode setting processing (step A8 of FIG. 7A) has been completed, it proceeds to the above-mentioned standby processing (step A2).

Next, when an incoming call or an email reception is detected on the basis of the signal received at the radio communication unit 14 (Yes in step A9 of FIG. 7A), the CPU 11 proceeds to an incoming call processing or email reception processing, which are shown in FIG. 10A to FIG. 10D, respectively (step A10).

Figure 10A:
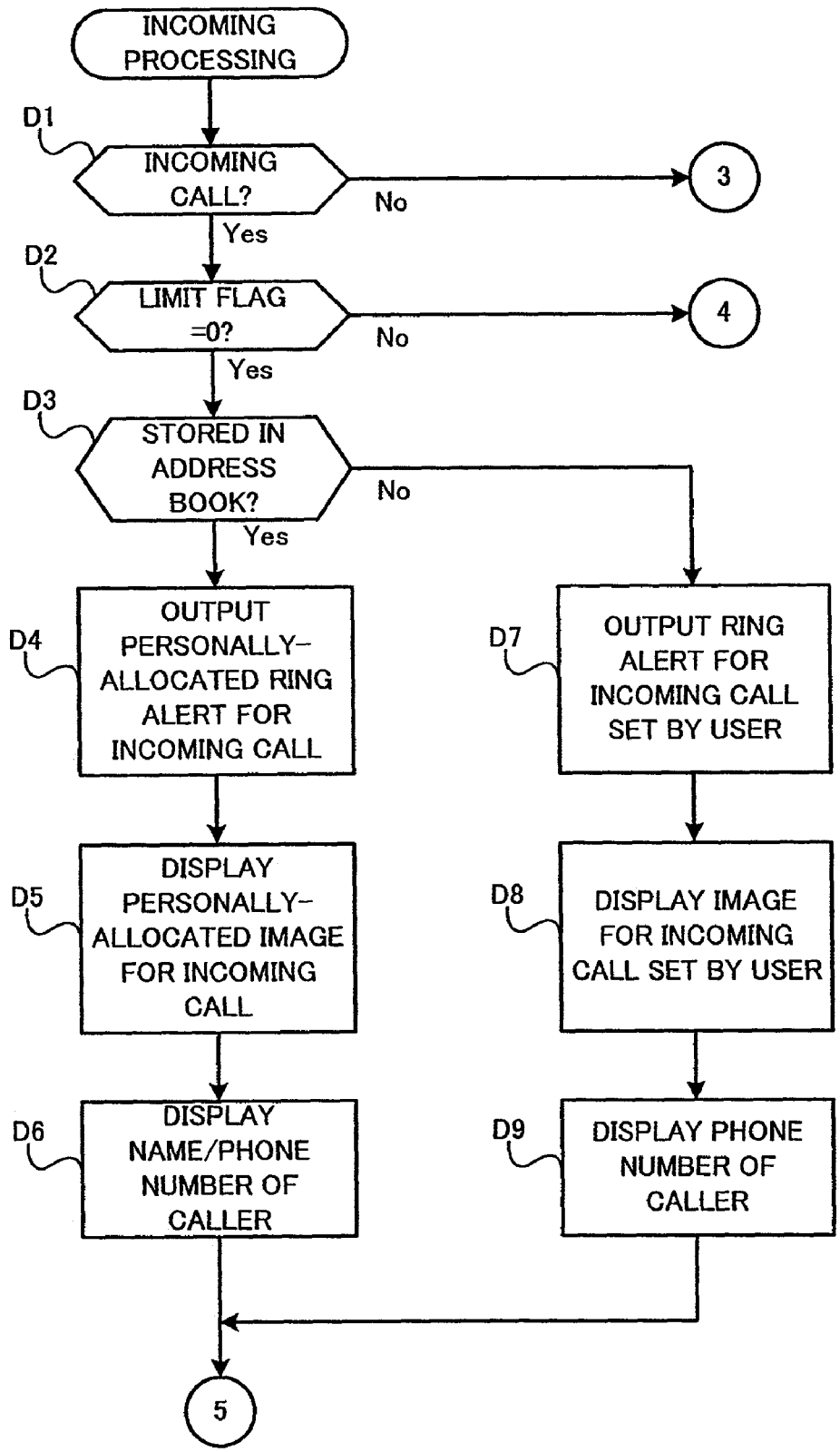
FIGS. 10A to 10D are flowcharts for explaining an incoming processing in detail.

As shown in FIG. 10A, when the incoming process starts, the CPU 11 determines whether the incoming is an incoming call or an email reception (step D1). When it is an incoming call (Yes in step D1), the CPU 11 consults the limit flag stored in the RAM 13 so as to determine whether the normal mode or the limited mode is set (step D2). In this case, if the limit flag is '0' (Yes in step D2), the CPU 11 obtains the "phone number" of the caller and consults the address book memory unit M4 so as to determine whether this "phone number" is stored or not (step D3).

Then, if the incoming call has come from the person whose information is stored in the address book memory unit M4 (Yes in step D3), the CPU 11 reads out, from the sound data memory unit M2, sound data, which is located in the 'data. ID' read out from the "personally-allocated ring alert for incoming call", which is identified by the "phone number". Then, the CPU 11 outputs this sound data output from the sound speaker 23 (step D4).

After that, the CPU 11 reads out, from the image data memory unit M1, image data, which is located in the 'data ID' read out from the "personally-allocated image for incoming call", which is identified by the "phone number". Then, the CPU 11 has the display unit 18 display this image data on the screen (step D5). Further, the CPU 11 reads out the "phone number" and the "name" corresponding thereto from the address book memory unit M4 and displays them with the personally-allocated image for incoming call (step D6).

Figure 13:
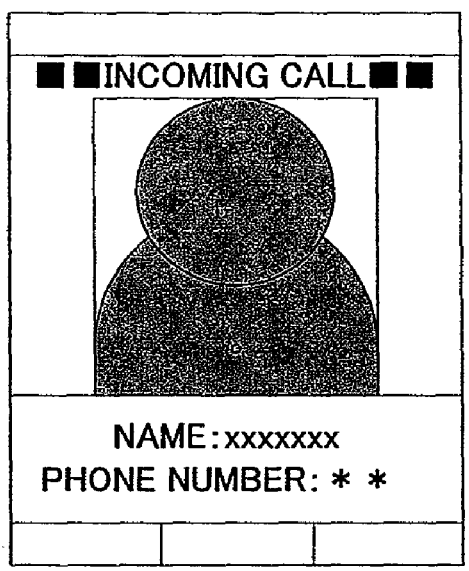
FIG. 13 is a view showing an example of an incoming display screen for displaying, in the case of incoming calls from the party at the other end of the communication, whose data is stored in the address book memory unit, images for incoming calls.

FIG. 13 shows an example of the display screen, on which a personally-allocated image for incoming call is displayed when an incoming call from the person, whose information is stored in the address book memory unit M4, has arrived. Displayed on this display screen are, besides an image for incoming call of the caller in question (portrait photo image), the phone number and the name of the caller.

When an incoming call from the person, whose information is not stored in the address book memory unit M4, arrives (No in step D3), the CPU 11 consults, at first, the setting information memory unit M3 and reads out, from the sound data memory unit M2, sound data, which is located in the 'data ID' stored in the item of the "user's selection" of the entry of the "ring alert for incoming call" and outputs this sound data from the sound speaker 23 (step D7).

Figure 14:
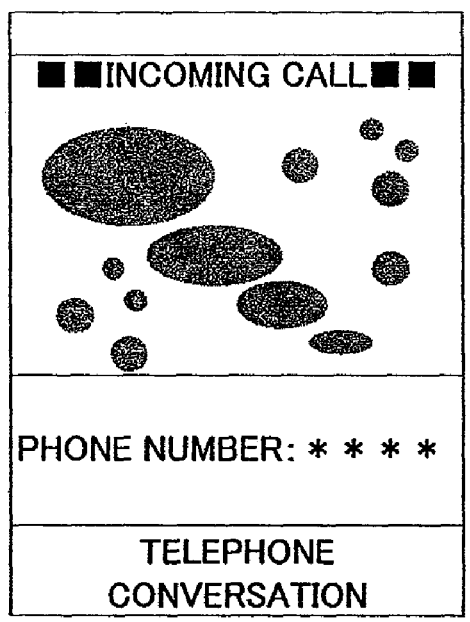
FIG. 14 is a view showing an example of an incoming display screen for displaying, in the case of incoming calls from the party at the other end of the communication, whose data is not stored in the address book memory unit, images for incoming calls set according to "user's selection".

Next, the CPU 11 reads out, from image data memory unit M1, image data, which is located in the 'data ID' stored in the "user's selection" as the entry of the "image for incoming call" and displays this image data on the display unit 18 (step D8). After that, the CPU 11 displays the phone number of the caller in question with this image for incoming call displayed on the display unit 18 (step D9). For example, the display screen shown in FIG. 14 shows that state, in which image for incoming call of the "user's selection" is displayed when the incoming call has arrived from the person, whose information is not stored in the address book memory unit M4. Specifically, this display screen shows the image for incoming call (in FIG. 14, a polka-dot pattern) and the phone number of the caller.

As thus described above, the CPU 11 firstly notifies the user of arrival of an incoming call by outputting data corresponding to the incoming call, and then determines whether an answering operation has been carried out within a predetermined period of time (for example, within ten seconds) or not (step D10, D11). In this case, when an answering operation has been carried out within a predetermined period of time (Yes in step D10), the CPU 11 makes the communication with the caller possible (step D12) and outputs voice sound of the caller from the earphone speaker 16 (step D13). On the other hand, when an answering operation has not been carried out even after the elapse of a predetermined period of time (Yes in step D11), a predetermined answering verbal message for absence (for example, "I am not available to take your call right now . . . ") is transmitted to the caller (step D14). Then, the CPU 11 activates the sound recording function so as to obtain the voicemail received from the party at the other end and makes the voice mail memory unit M5 store this sound data (step D15). After that, the CPU 11 makes the earphone speaker 16 output this audio sound from the party at the other end while recording it (step D16).

On the other hand, when the limit flag is '1' and the limited mode is set at the time of processing for incoming (No in step D2), the CPU 11 consults the setting information memory unit M3 and determines whether the item of the "in limited mode" of the entry of the "incoming call notification" is set to the 'initial value' or not (step D17). In the example shown in FIG. 5, the "in limited mode" is set to the 'initial value' (Yes in step D17), the CPU 11 reads out the ring alert for incoming call and the image for incoming call, which are located in the "initial value" and outputs them (step D18, D19).

Figure 15:
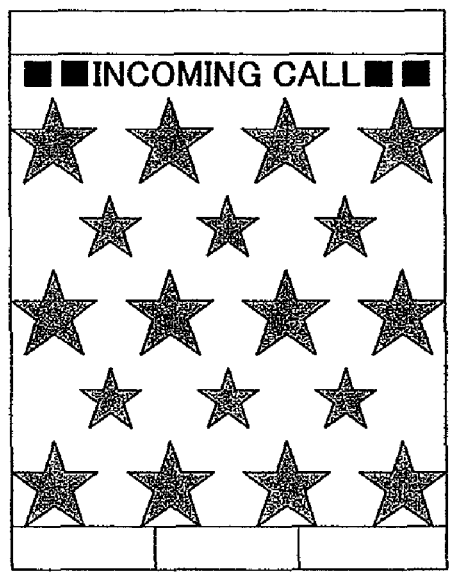
FIG. 15 is a view showing an example of an incoming display screen for displaying, in the case of incoming calls in a limited mode, images for incoming calls set according to "initial value".

In other words, when the "in limited mode" of the entry of the "ring alert for incoming call" and the "image for incoming call" of the setting information memory unit M3 is set to the 'initial value', the CPU 11 reads out sound data/image data, which is located in the 'data ID', shown as "initial value", from the sound data memory unit M2/image data memory unit M1, and makes the sound speaker 23/display unit 18 output this data. FIG. 15 shows an example of the state of the display screen, in which an incoming call has arrived at the time of limited mode and the "image for incoming call" of the setting information memory unit M3 is set to the 'initial value'. As shown in FIG. 15, this display screen shows a pattern having no specific meaning (for example, star pattern) as the image for incoming call of the 'initial value'. Therefore, regardless of whether the 'name' or 'phone number' of the caller is stored in the address book memory unit M4, the personal information of the caller is not displayed.

Figure 16:
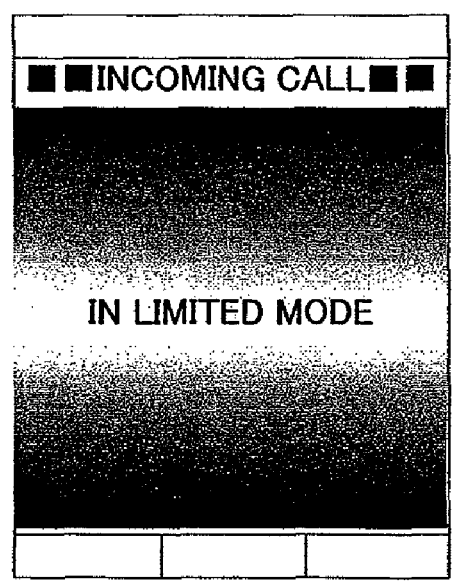
FIG. 16 is a view showing an example of an incoming display screen for displaying, in the case of incoming phone calls in a limited mode, images for incoming calls 'specified'.

Furthermore, when the "in limited mode" of the entry of the "incoming call notification" is set to the 'specified' (No in step D17), the CPU 11 reads out sound data/image data, which is located in the 'data ID', shown as 'specified, from the sound data memory unit M2/image data memory unit M1' and makes the sound speaker 23/display unit 18 output this data (step D20, D21). FIG. 16 shows an example of the state of the display screen, in which an incoming call has arrived in limited mode and the "image for incoming call" of the setting information memory unit M3 is set to the 'specified'. As shown in FIG. 16, this display screen shows several words meaning that the limited mode is set right now as the image for incoming call of the 'specified'. Therefore, regardless of whether the information about the caller is stored in the address book memory unit M4 or not, the personal information of the caller is not displayed.

Next, the CPU 11 obtains information from the RTC 22 and determines whether a predetermined period of time (for example, 10 seconds) has elapsed since detection of an incoming call (step D22). If a predetermined period of time has elapsed (Yes in step D22), the CPU 11 transmits an answering message to the caller (step D23). After that, the CPU 11 makes the voice mail memory unit M5 store the voice message sent from the caller (step D24). In this case, in order to prevent the voice sound of the caller from being output, the earphone speaker 16 is turned off (step. D25).

Figure 10B:
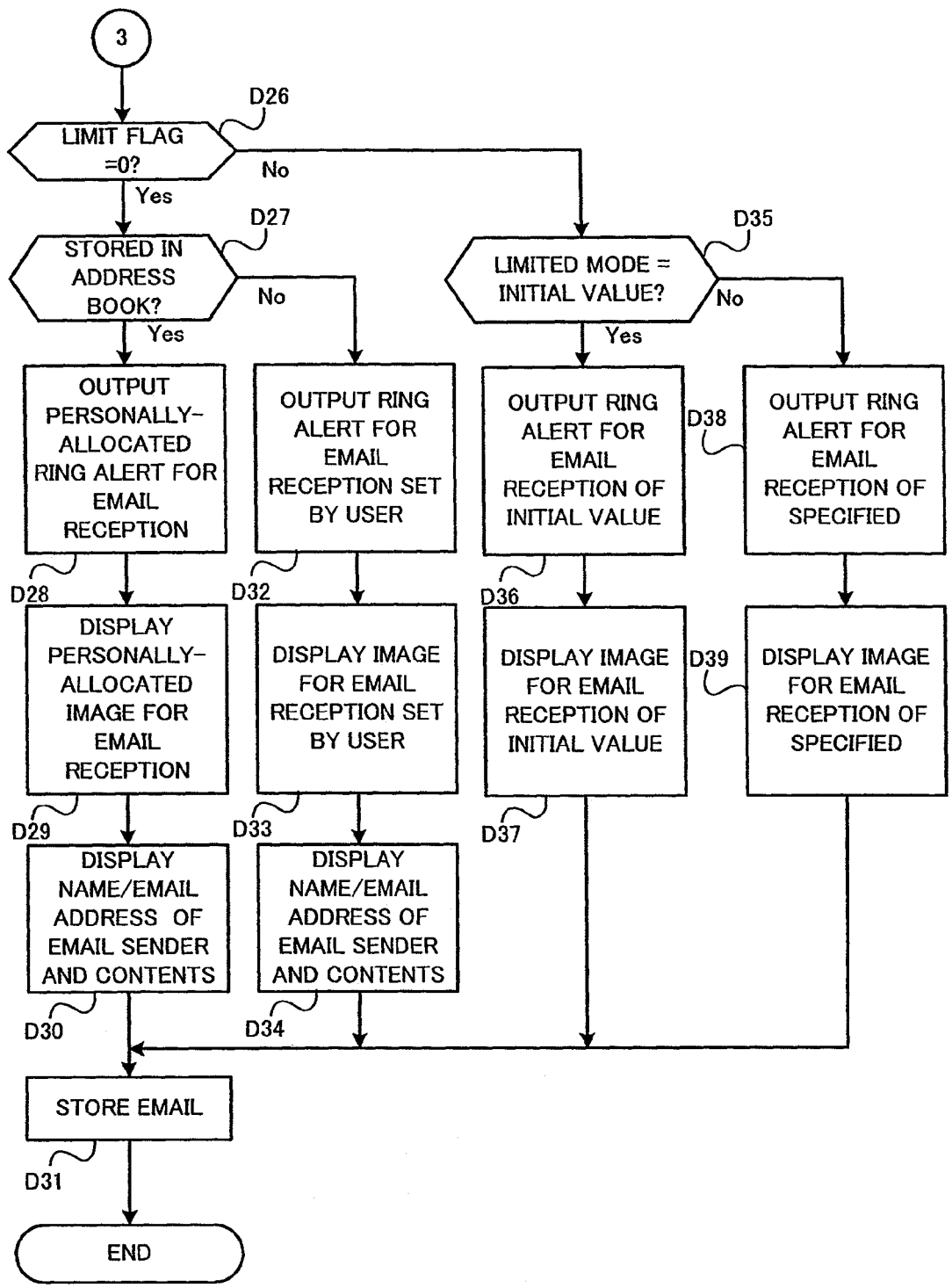
Figure 10C:
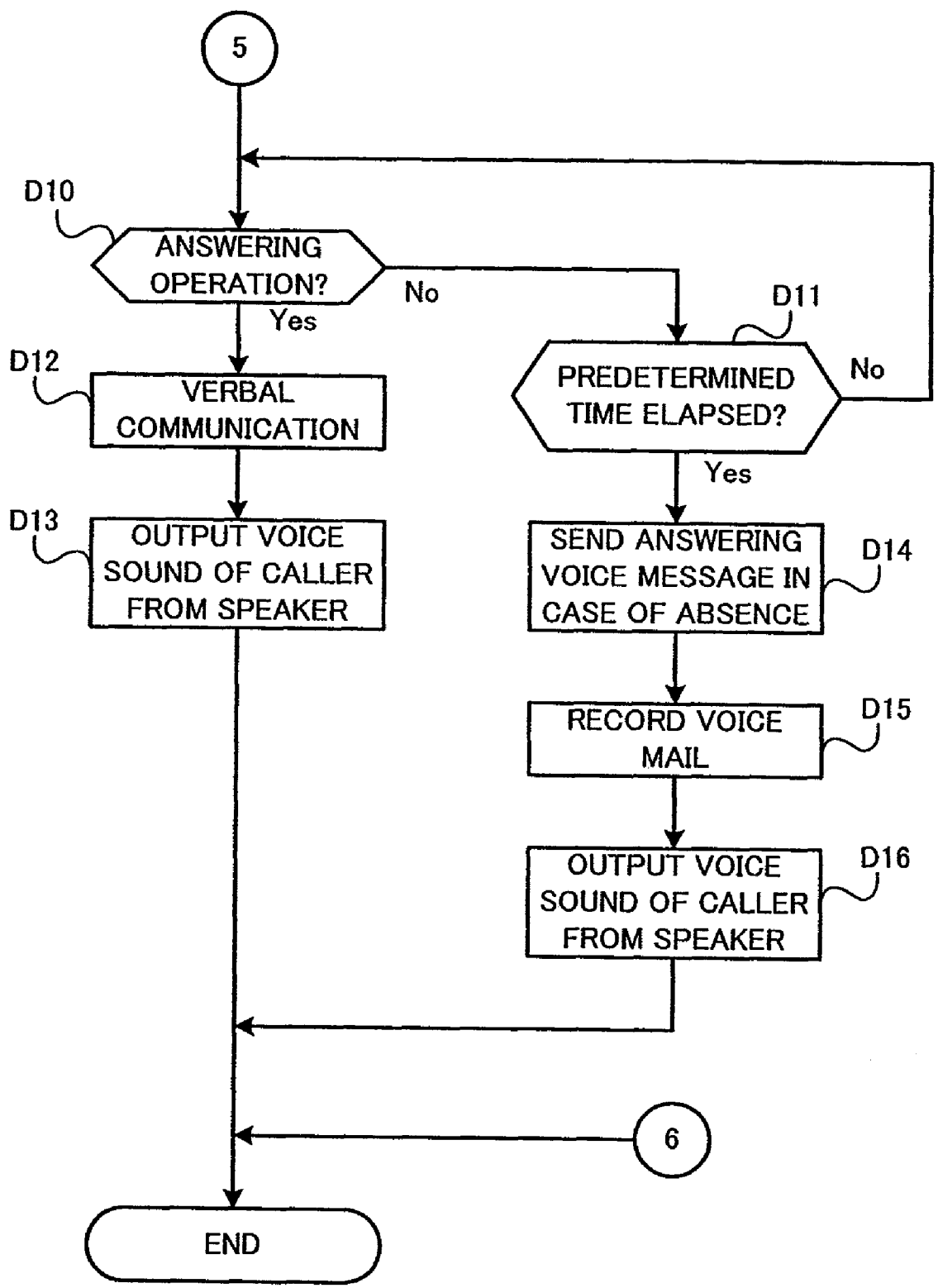
Figure 10D:
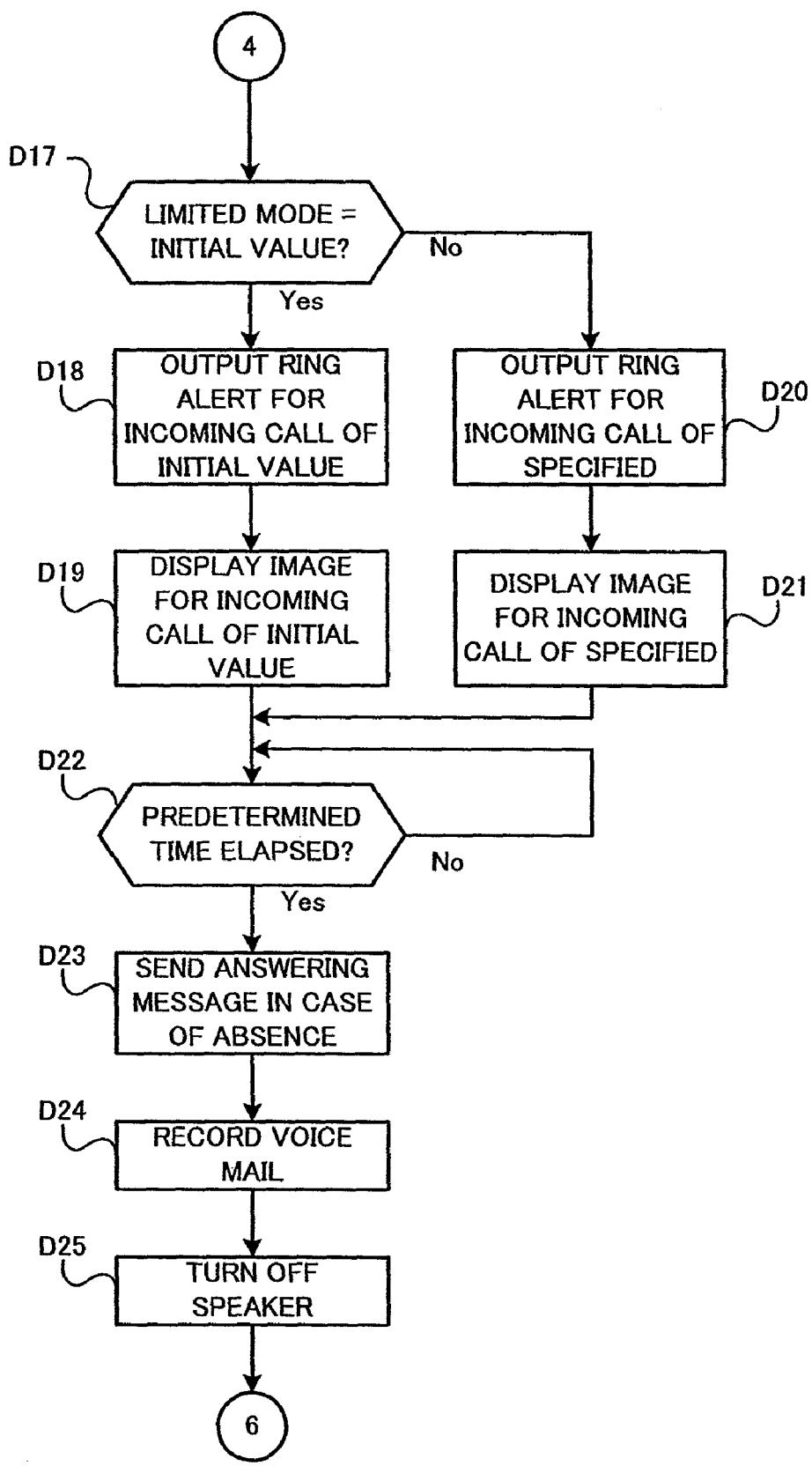

On the other hand, in the case of detection of an email reception (No in step D1 of FIG. 10A), it proceeds to the flow shown in FIG. 10B and the CPU 11 consults the limit flag stored in the RAM 13. When the limit flag is '0' (Yes in step D26), the CPU 11 determines whether the 'email address' of the email sender is set in the 'email address' of the address book memory unit M4 or not (step D27). When the email has been sent from the person, whose email address is set in the address book memory unit M4 (Yes in step D27), the CPU 11 reads out, from the sound data memory unit M2, sound data, which is located in the 'data ID' stored in the "personally-allocated ring alert for email reception" corresponding to this 'email address', and makes the sound speaker 23 output this sound data as the ring alert for email reception (step D28).

Then, the CPU 11 reads out, from the image data memory unit M1, image data, which is located in the 'data ID' stored in the "personally-allocated image for email reception" corresponding to this 'email address', and makes the display unit 18 display this image data (step D29). Further, the CPU 11 reads out, from the address book memory unit M4, the "name" corresponding to this 'email address', and makes the display unit 18 display the 'name', the 'email address' read out and a part of the email message (for example, character information such as the title of the email message) (step D30). Note that the state of the display screen in the case of this email reception is basically the same as the state of the display screen in the case of the arrival of incoming call, except that in this case the 'email address' is displayed instead of the 'phone number' and the title of the email message etc. is also displayed. Then, the CPU 11 additionally stores the data of the received email in the email memory unit M6 (step D31) and returns to the standby processing (step A2 of FIG. 7A).

When the email has been sent from the person, whose information is not stored in the address book memory unit M4 (No in step D27), the CPU 11 consults the setting information memory unit M3 and reads out, from the sound data memory unit M2, sound data, which is located in the 'data ID' stored in the "user's selection" of the entry of the "ring alert for email reception" and makes the sound speaker 23 output this sound data as the ring alert for email reception (step D32). Then, the CPU 11 reads out, from the image data memory unit M1, image data, which is located in the 'data ID' stored in the "user's selection" of the entry of the "image for email reception" of the setting information memory unit M3 and makes the display unit 18 display the image data as the image for email reception (step D33).

Furthermore, the CPU 11 displays the 'email address' of the email sender with the image for email reception corresponding to the "user's selection", beside a part of the email message such as the title (step D34). The state of the display screen in the case of this email reception is basically the same as in the case of an incoming call shown in FIG. 14, except that in this case the 'email address' is displayed instead of the 'phone number' and the title of the received email or the like is also displayed. After that, the CPU 11 stores data of the received email in the email memory unit M6 (step D31) and returns to the standby processing (step A2 of FIG. 7A).

On the other hand, when the limit flag is '1' and the limited mode is set (No in step D26), the CPU 11 consults the setting information memory unit M3 and determines whether the "in limited mode" of the entry of the "email reception notification" is set to the 'initial value' or not (step D35). In this case, when the "in limited mode" is set to the 'initial value' (Yes in step D35), the CPU 11 reads out sound data/image data, which is located in the 'data ID' stored in the "initial value", from the sound data memory unit M2/image data memory unit M1, and makes the sound speaker 23/display unit 18 output the sound data/image data as the ring alert for email reception/image for email reception (step D36, D37).

Further, in the state in which the arrival of the date, on which the alarm will be activated, is observed (step A11 of FIG. 7B), when the CPU 11 detects the arrival of this alarm date (Yes in step A11), it proceeds to the alarm processing (step A12). In this case, the CPU 11 compares the 'current date' clocked by the RTC 22 and the 'planned date (alarm date)' stored in the "content of setting" corresponding to the "alarm notification" of the setting information memory unit M3 and determines whether it should proceed to the alarm processing.

Figure 11:
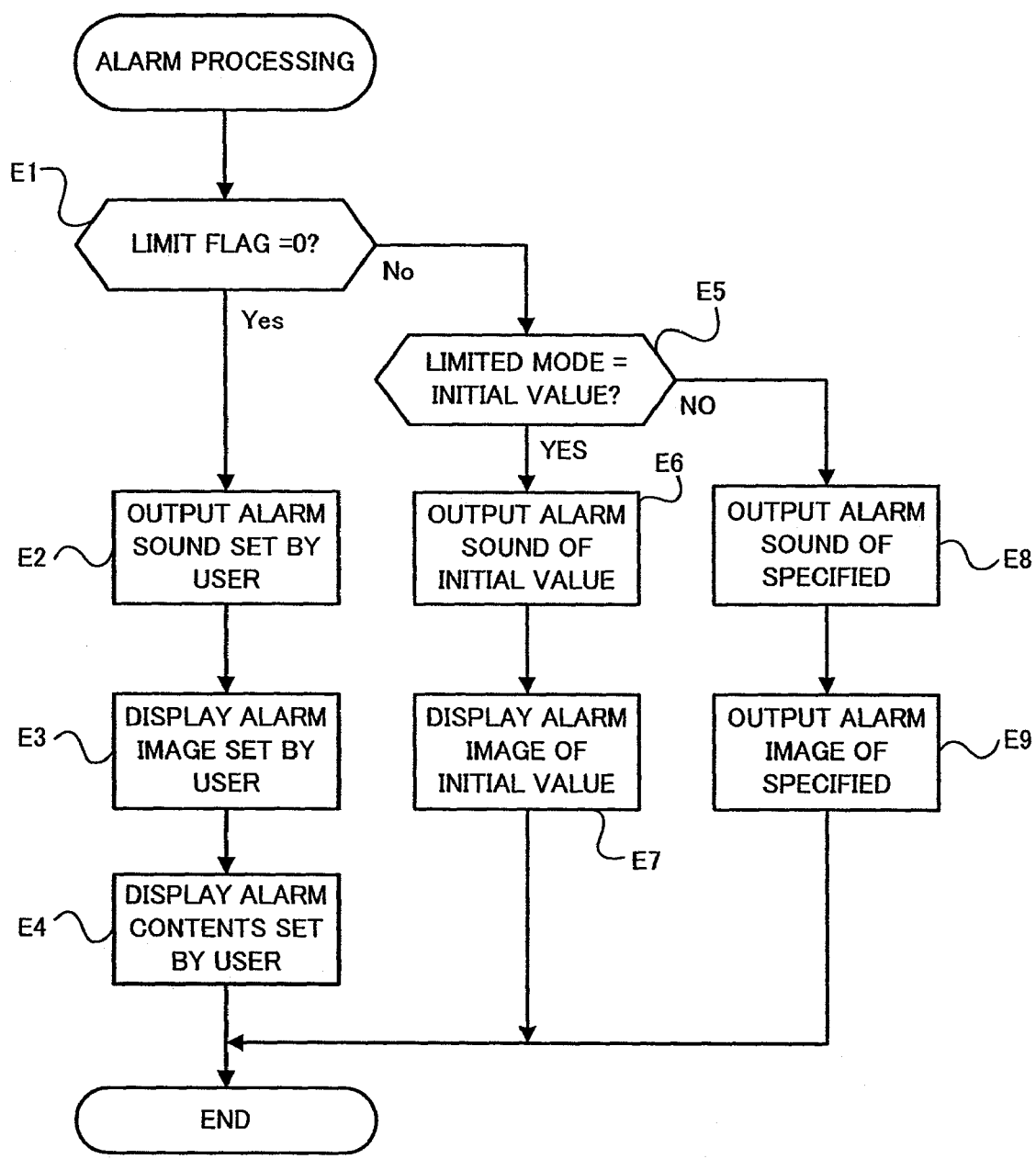
FIG. 11 is a flowchart for explaining alarm processing in detail.

As the alarm processing (step A12 of FIG. 7B) begins, as shown in FIG. 11, the CPU 11 consults the limit flag stored in the RAM 13. Then, if the limit flag is '0' (Yes in step E1), the CPU 11 consults the setting information memory unit M3 and reads out, from the sound data memory unit M2, sound data, which is located in the 'data ID' stored in the "user's selection" of the entry of the "alarm sound" of the "alarm notification". The CPU 11 makes the sound speaker 23 output this sound data (step E2).

Figure 17:
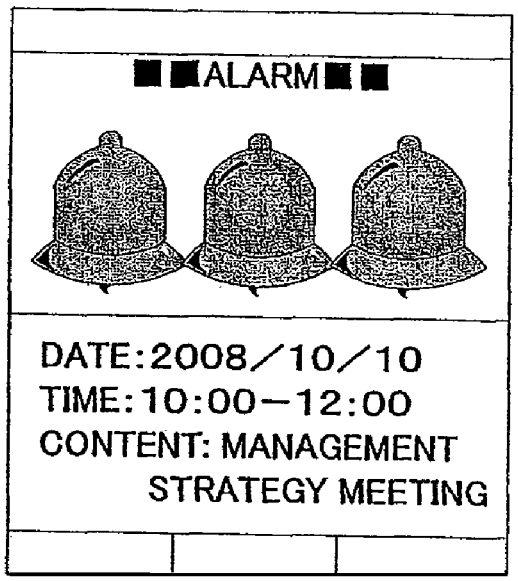
FIG. 17 is a view showing an example of an alarm notification display screen in the case in which the limited mode is canceled.

Next, the CPU 11 reads out, from the image data memory unit M1, image data, which is located in the 'data ID' stored in the "user's selection" of the entry of the "alarm image" of the "alarm notification" and makes the display unit 18 display the image data as the alarm image (step E3). Further, the CPU 11 reads out, from the setting information memory unit M3, the "content of setting" of the entry of the "alarm notification" and displays it with the alarm image (step E4). FIG. 17 shows an example of the state of the display screen, on which the alarm notification is displayed when the limited mode is not set. In FIG. 17, in addition to the alarm image (for example, bell pattern), the content of alarm setting is displayed for guidance.

On the other hand, when the limit flag is '1' (No in step E1), the CPU 11 consults the setting information memory unit M3 and determines whether each "in limited mode" of the entry of the "alarm sound" and "alarm image" is set to the 'initial value' or not (step E5). When the 'initial value' is set (Yes in step E5), the CPU 11 reads out sound data and the image data, which are respectively located in the 'data ID' stored in the "initial value", from the sound data memory unit M2/image data memory unit M1. The CPU 11 makes the sound speaker 23/display unit 18 output that data as the alarm sound/alarm image (step E6, E7).

Figure 18:
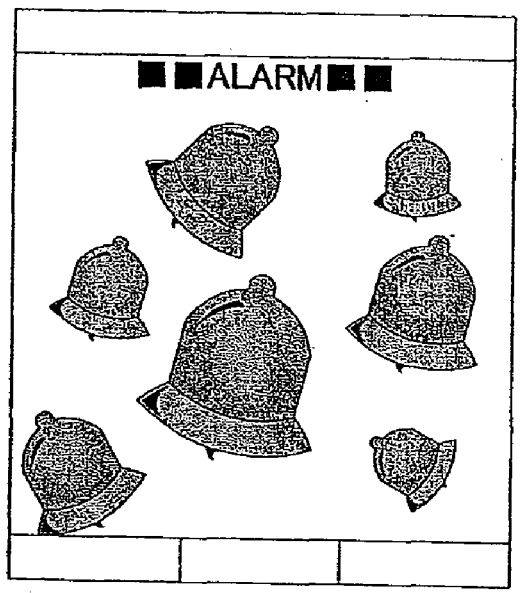
FIG. 18 is a view showing an example of an alarm notification display screen in the case in which the limited mode is canceled, wherein the "in limited mode" is set to 'initial value'.

FIG. 18 shows an, example of the state of the display screen in the case of the alarm notification, when the "in limited mode" of the setting information memory unit M3 is set to the 'initial value'. As shown in FIG. 18, the display screen in the case of this alarm notification does not show the content of alarm setting. Further, if the "in limited mode" is set to 'specified' (No in step E5), the CPU 11 reads out sound data/image data, which is located in the 'data ID' shown in 'specified', from the sound data memory unit M2/image data memory unit M1, and makes the sound speaker 23/display unit 18 output this data as the alarm sound/alarm image (step E8, E9).

The CPU 11 also observes a no-operation timer (not shown) for measuring time in which no operation is carried out (for example, five minutes). When the timeout (elapse of over five minutes) is detected (Yes in step A13 of FIG. 7B), it proceeds to the screen saver displaying processing (step A14).

Figure 12:
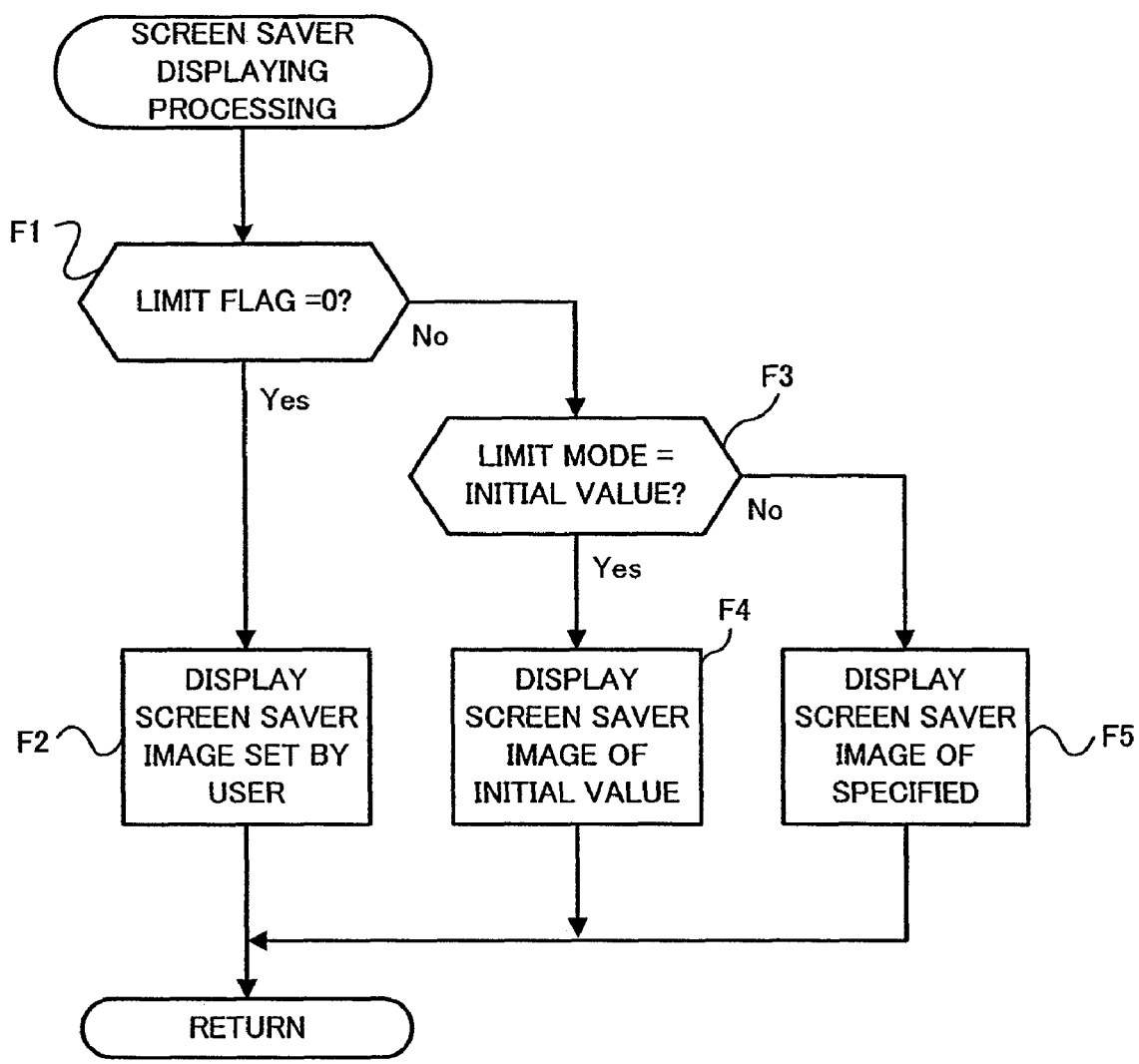
FIG. 12 is a flowchart for explaining screen saver displaying processing in detail.

As the screen saver displaying processing (step A14 of FIG. 7B) begins, as shown in FIG. 12, the CPU 11 consults the limit flag stored in the RAM 13. When the limit flag is '0' (Yes in step F1), the CPU 11 consults the setting information memory unit M3 and reads out, from the image data memory unit M1, image data, which is located in the 'data ID' stored in the item of "user's selection" of the entry of the "screen saver image". The CPU 11 makes the display unit 18 output the image data as the screen saver image (step F2).

When the limit flag is '1' (No in step F1), the CPU 11 consults the setting information memory unit M3 and determines whether the "in limited mode" of the entry of the "screen saver image" is set to the 'initial value' or not (step F3). When the 'initial value' is set (Yes in step F3), the CPU 11 reads out, from the image data memory unit M1, image data, which is located in the 'data ID' read out from this "initial value". The CPU 11 makes the display unit 18 output this image data as the screen saver image (step F4). When the "in limited mode" is set to the 'specified' (No in step F3), the CPU 11 reads out, from the image data memory unit M1, image data, which is located in the 'data ID' shown in this "specified" and makes the display unit 18 display this image data as the screen saver image (step F5).

Note that when the CPU 11 detects the power-off operation (Yes in step A15 of FIG. 7B), the CPU 11 carries out the operation of turning off regardless of whether the limited mode is set or not (step A16). When the operation other than the setting operation and the switching off operation has been carried out, for example, the limited mode setting operation, the transmitting operation, the sound recording operation, the imaging operation, the data downloading operation or the like has been carried out (Yes in step A17), if the limit flag is '0' (Yes in step A18), the CPU 11 judges the operation in question as valid and performs the processing corresponding to the respective operations (step A19). For example, the CPU 11 carries out the limited mode setting processing, the transmitting processing or the sound recording processing. It should be noted that the limited mode setting processing in this case is the same as the limited mode setting processing (referring to FIG. 9) in the case of remote operation described above.

As thus described above, according to this embodiment of the present invention, the CPU 11 makes the display unit 18 and the sound speaker 23 output data, which is arbitrarily selected by the user, in the state in which not the limited mode but the normal state is set. When the limited mode is set, the CPU 11 outputs a predetermined data instead of the data selected by the user. As a result, when the data selected by the user is to be output according to the function of the cellular phone device 1, if the limited mode is set, the output of the data selected by the user will be limited. Therefore, the output of the data, which the third party should not know, can be reliably prevented, which is effective in terms of security management.

When the user is notified of the incoming call or email reception in the state in which the limited mode is set, the CPU 11 outputs a predetermined data instead of the data selected by the user. Therefore, the leakage of the preference of the user to the third party from the ring alert or the image for incoming call or email reception can be prevented. Further, even if the data, which is notified as it arrives, contains important information, the leakage of this image can be prevented.

When the incoming call or email reception is notified in the state in which the limited mode is set, the CPU 11 outputs predetermined notification data for incoming call or email reception stored in the address book memory unit M4, instead of the personally-allocated notification data for incoming call or email reception, which is specific to each person at the other end of the communication. Therefore, even if the notification data for incoming call or email reception contains information about the person at the other end, specifically, if as the image for incoming call or email reception the portrait photo image of the party at the other end is used or if as the ring alert for incoming call or email reception the voice sound of the party at the other end is used, the leakage of such information can be prevented by setting the limited mode.

In the case in which the alarm is to be output in the state in which the limited mode is set, the CPU 11 outputs predetermined alarm notification data, instead of the alarm notification data stored in the various setting information memory unit M3. As a result, the output of the alarm sound, the alarm image or contents of setting is prevented from being leaked so that the preference of the user is prevented from being leaked to the third party. Moreover, even though the alarm notification data contains important information, the leakage of this information can be prevented.

In the case in which image data (for example, a wallpaper image, a screen saver image etc.) is to be output in the state in which the limited mode is set, the CPU 11 outputs predetermined image data, instead of the image data selected by the user and stored in the various setting information memory unit M3. As a result, the leakage of the preference of the user to the third party from the outputted image data can be prevented. Moreover, even though the image data contains important information, the leakage of this information can be prevented.

It is possible to give directions to the cellular phone device 1 from outside by operating other devices so that the limited mode is set. Therefore, the security can be ensured by performing remote operation when the theft or loss is discovered. Further, by quickly taking necessary steps, the leakage of information can also be prevented.

Figure 19:
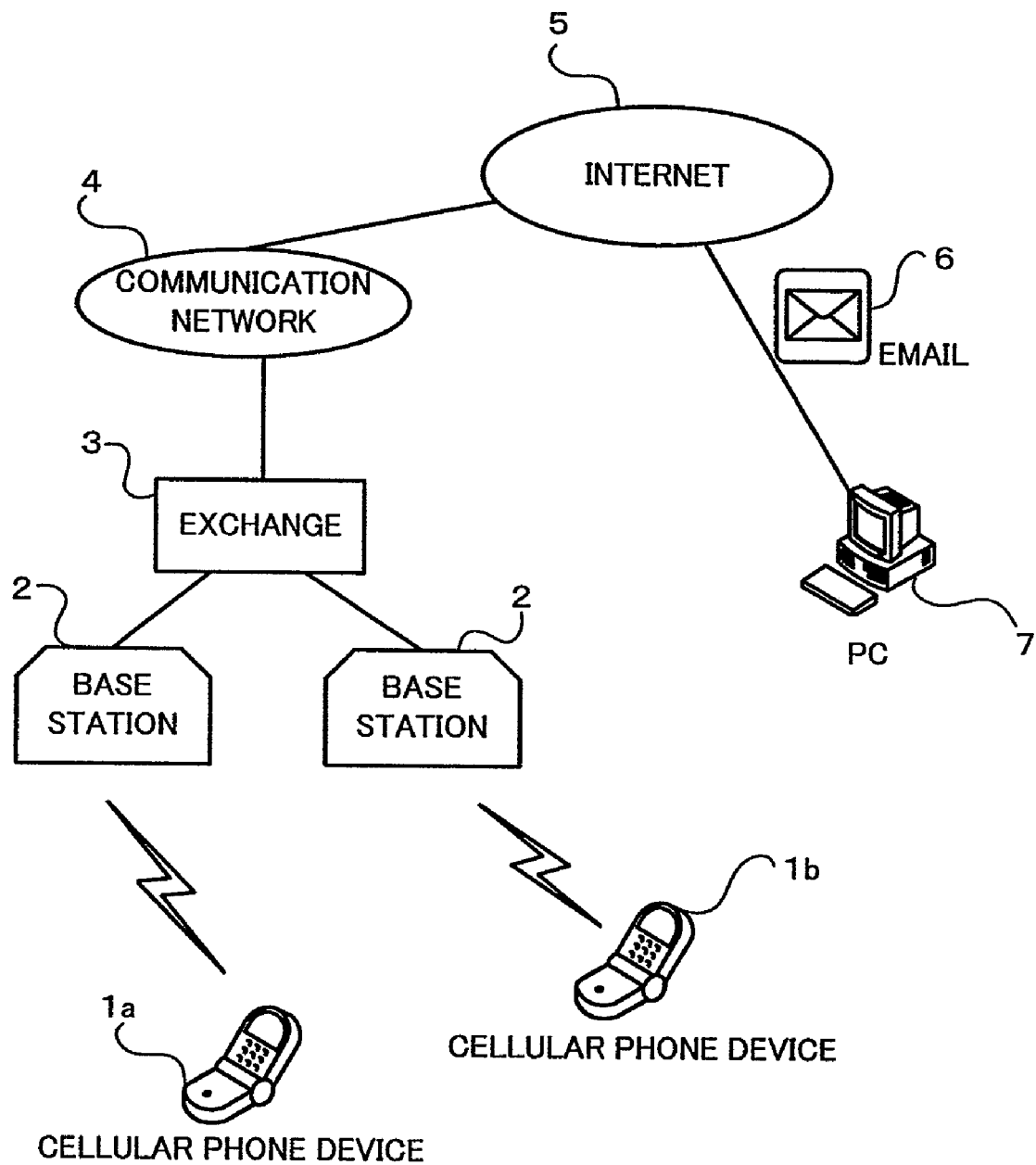
FIG. 19 is a view showing a specific example of sending directions to the cellular phone device for changeover to the limited mode by remote operation.

As a method of remote operation, for example, a method for sending an electronic mail 6, containing a predetermined direction signal (such as several words), and a method for making a predetermined number of calls within a predetermined period of time from one cellular phone device 1b to another cellular phone device 1a, as shown in FIG. 19 are known. As thus described above, the CPU 11 in the cellular phone device 1a, which has received a specific direction signal, performs the setting/cancellation of the limited mode according to the limited mode setting processing shown in FIG. 10.

Limitations are imposed on the output of various information such as voice sound of the party at the other end of the communication, content of the email sent etc. when an incoming call has arrived or an email has been received, when the limited mode is set. Therefore, according to the present invention, it is possible to reliably prevent the leakage of the information about the party at the other end of the communication and to ensure security only by setting the limited mode without imposing any limitation on the telephone conversation function or the email function.

Further, limitations are imposed on the output of the information such as the "phone number" or "email address" with which the party at the other end of the communication can be identified, when an incoming call has arrived, or an email has been received when the limited mode is set. Therefore, according to the present invention, the important information about the party at the other end of the communication can be prevented from being leaked.

The output of the voice sound sent from the party at the other end of the communication is prevented when an incoming call has arrived when the limited mode is set. Therefore, according to the present invention, the third party is prevented from specifying the gender or the age bracket of the party at the other end by his voice sound and from disguising himself as the owner of the cellular phone device to have a conversation with the party at the other end. As a result, the leakage of the important information about the party at the other end of the communication can be prevented.

In the case of email reception when the limited mode is set, the output of the character information (contents of the email message) sent by the party at the other end of the communication is prevented. Therefore, according to the present invention, the leakage of the important information about the party at the other end of the communication can be prevented.

Note that in the embodiment described above, the memory units (the various setting information memory unit M3, the address book memory unit M4) for storing data selected through the operation of the user at his own choice store the 'data ID' for identifying image data or sound data, however, it should not be construed restrictively. It is also possible to make the memory units store the actual data thereof.

Further, according to the above-described embodiment of the present invention, data of the initial value or specific data corresponding to the limited mode is output instead of data arbitrarily selected by the user. This alternative data may be not the initial data or specific data but data selected by the user at his own choice. Furthermore, a blank image or no sound may also be the alternative data. The present invention is not limited to the cellular phone device but is also applicable to electronic devices such as a notebook type PC, a PDA, an electronic camera, an electronic watch or a music, reproducer as well.

Note that according to the above-mentioned embodiment of the present invention, the CPU 11 performs operations in accordance with the program code stored in the ROM 12. However, it should not be construed restrictively. The CPU 11 can also perform operations in accordance with the program code transported via a transport medium. In other words, the CPU 11 may also perform the operations shown in this embodiment of the present invention by utilizing a program/data supplied from the outside via a transport medium in addition to a recording medium.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2007-132383 filed on May, 18, 2007 and including specification, claims, drawings and summary. The disclosure of the above Japanese Patent Application is incorporated herein by reference in its entirety.

What is claimed is:

1. An electronic device, comprising:
an output unit that outputs data;
a data memory unit that stores data specified by a user operation;
a mode setting unit that sets a limited mode for limiting an operation;
a detecting unit that detects an occurrence of an event;
a determining unit that determines whether the limited mode is set by the mode setting unit in the case in which the detecting unit detects the occurrence of the event;
a first output control unit that reads out data stored in the data memory unit and makes the output unit output the data according to the event detected by the detecting unit in the case in which the determining unit determines that the limited mode is not set; and
a second output control unit that makes the output unit output predetermined data, instead of data stored in the data memory unit, according to the event detected by the detecting unit in the case in which the determining unit determines that the limited mode is set.

2. The electronic device according to claim 1, further comprising:
a communication unit that communicates with an external device, wherein:
the data stored in the data memory unit includes incoming notification data;
the detecting unit detects an incoming to the communication unit as the occurrence of an event;
the first output control unit reads out the incoming notification data stored in the data memory unit and makes the output unit output the incoming notification data when the detecting unit detects the incoming; and
the second output control unit makes the output unit output predetermined incoming notification data, instead of the incoming notification data stored in the data memory unit, when the detecting units detects the incoming.

3. The electronic device according to claim 2, wherein:
the data memory unit stores for each party at the other end of the communication the incoming notification data;
the first output control unit reads out the incoming notification data corresponding to the party at the other end of the communication, from the data memory unit and makes the output unit output the incoming notification data when the detecting unit detects the incoming; and
the second output control unit makes the output unit output predetermined incoming notification data, instead of the incoming notification data corresponding to the party at the other end of the communication when the detecting unit detects the incoming.

4. The electronic device according to claim 1, wherein:
the data stored in the data memory unit includes alarm notification data;
the output unit further includes a notification unit that outputs the alarm notification data at a predetermined time; the detecting unit detects a beginning of an operation of the notification unit for outputting the alarm notification data as the occurrence of an event;
the first output control unit reads out the alarm notification data stored in the data memory unit and makes the output unit output the alarm notification data when the detecting unit detects the occurrence of the event; and
the second output control unit makes the output unit output predetermined alarm notification data, instead of the alarm notification data stored in the data memory unit, when the detecting unit detects the occurrence of the event.

5. The electronic device according to claim 1, wherein:
the data stored in the data memory unit includes image data;
the first output control unit reads out image data stored in the data memory unit and makes the output unit output the image data when the detecting unit detects the occurrence of the event; and
the second output control unit makes the output unit output predetermined image data, instead of the image data stored in the data memory unit, when the detecting unit detects the occurrence of the event.

6. The electronic device according to claim 1, wherein the mode setting unit sets the limited mode in accordance with a remote operation from outside.

7. The electronic device according to claim 1, wherein the limited operation comprises an operation directly performed at the electronic device.

8. A non-transitory computer-readable medium encoded with a computer program executed by a computer that causes an electronic device to output data, the computer program comprising:
program code for performing a function for outputting the data;
program code for performing a function for storing data specified by a user operation;

program code for performing a function for setting a limited mode in which limitations are imposed on an operation;
program code for performing a function for detecting an occurrence of an event;
program code for performing a function for determining whether the limited mode is set or not in the case in which the occurrence of the event is detected; program code for performing a function for reading out the data stored and outputting the data stored, according to the event detected in the case in which it is determined that the limited mode is not set; and
program code for performing a function for outputting predetermined data outputted, instead of the data stored, according to the event in the case in which it is determined that the limited mode is set.

* * * * *

UNITED STATES PATENT AND TRADEMARK OFFICE
CERTIFICATE OF CORRECTION

PATENT NO. : 8,301,204 B2
APPLICATION NO. : 13/162279
DATED : October 30, 2012
INVENTOR(S) : Jun Itou It is certified that error appears in the above-identified patent and that said Letters Patent is hereby corrected as shown below:

On the title page, item (73), Assignee should read:

~~Casio Hitachi Mobile Communications Co. Ltd., Tokyo (JP)~~

<u>NEC CASIO MOBILE COMMUNICATIONS, LTD., Kawasaki, Kanagawa (JP)</u>

Signed and Sealed this
Seventh Day of May, 2013

Teresa Stanek Rea
*Acting Director of the United States Patent and Trademark Office*